UNITED STATES PATENT OFFICE.

JAMES E. SUMMERS, OF LYNCHBURG, VIRGINIA, ASSIGNOR TO THE SUMMERS MARBLE COMPANY, OF SAME PLACE.

ARTIFICIAL MARBLE OR STONE.

SPECIFICATION forming part of Letters Patent No. 639,914, dated December 26, 1899.

Application filed March 25, 1899. Serial No. 710,473. (No specimens.)

*To all whom it may concern:*

Be it known that I, JAMES E. SUMMERS, a citizen of the United States, residing at Lynchburg, in the county of Campbell and State of Virginia, have invented certain new and useful Improvements in Artificial Marble or Stone, of which the following is a full, clear, and exact description.

My invention relates, first, to a liquid composition which when mixed with certain cementing substances, hereinafter specified, in a pulverized or granular condition shall be hardened and solidified to such a degree that the resulting product shall be capable of use as an artificial marble or stone and closely resemble those minerals as to grades of quality, finish, color, &c.

My invention relates, further, to a composition or body including as an ingredient the said liquid mixed with said solid materials.

In carrying out the first part of my invention—that is to say, the preparation of the liquid composition mentioned—I take the following ingredients and mix them in substantially the proportions and manner hereinafter specified, to wit: to ten (10) gallons of milk of lime I add one-half (½) pound of glycerin, six (6) ounces of silicate of soda, one-half (½) pound of common soap, two (2) pounds of common salt, and one-half (½) pound of ground marshmallow-root. These ingredients are placed in a suitable vessel and boiled and stirred together until they combine, after which the preparation is run through a sieve. It is then ready for use.

In carrying out the second part of my invention, involving the use of the said liquid preparation with the solid materials, and in order to make artificial marble or stone, I take hydraulic cement, gypsum, or any of the solids used in the arts for such purposes and reduce them to a pulverulent or granular condition. I then mix with said granulated materials a sufficient quantity of my said liquid composition to form a plastic mass of such consistency as to enable it to be easily molded by hand or to be placed in molds to form or cast such articles as may be desired. The necessary colors or tints may be added to the mass, preferably while it is being kneaded, should it be desired to have the resulting body colored or tinted throughout, or the color or tint may be applied to the surface only.

I do not limit myself to the use of the particular solid matters above mentioned, as any material calculated to produce the desired result when mixed with the liquid composition specified may be employed. The said liquid composition will give strength and hardness to any concrete substance formed of particles that have been mixed therewith and packed together while the mass is in a plastic state.

Having thus described my invention, I claim—

1. A composition of matter, consisting of milk of lime, glycerin, silicate of soda, soap, salt and ground marshmallow-root, as set forth.

2. A composition of matter, consisting of the herein-mentioned ingredients in proportions substantially as follows, to wit: ten gallons of milk of lime, one-half pound of glycerin, six ounces of silicate of soda, one-half pound of soap, two pounds of salt, and one-half pound of ground marshmallow-root, as set forth.

3. A composition of matter consisting of a solution composed of milk of lime, glycerin, silicate of soda, soap, salt, and marshmallow-root, in proportions substantially as specified, combined with a cementing substance in granular form, as set forth.

4. An artificial stone or marble consisting of a cementing substance, and a liquid compound of milk of lime, glycerin, silicate of soda, soap, salt, and marshmallow-root, in or about the proportions specified, as set forth.

In testimony whereof I hereunto set my hand.

JAMES E. SUMMERS.

Witnesses:
J. M. B. LEWIS,
W. R. LAYNE.